US010114664B1

(12) United States Patent
Tripathy et al.

(10) Patent No.: US 10,114,664 B1
(45) Date of Patent: Oct. 30, 2018

(54) SYSTEMS AND METHODS FOR AUTOMATED DELIVERY AND IDENTIFICATION OF VIRTUAL DRIVES

(71) Applicant: Veritas Technologies LLC, Mountain View, CA (US)

(72) Inventors: Soumya Tripathy, West Bengal (IN); Aditya Deshpande, Pune (IN); Amit Gupte, Maharashtra (IN); Mohini Rahalkar, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 14/859,389

(22) Filed: Sep. 21, 2015

(51) Int. Cl.
*G06F 9/455* (2018.01)

(52) U.S. Cl.
CPC ...... *G06F 9/45533* (2013.01); *G06F 9/45558* (2013.01); *G06F 2009/45583* (2013.01)

(58) Field of Classification Search
CPC ............ G06F 9/45533; G06F 9/45558; G06F 9/5005; G06F 2009/45573; G06F 2009/45579
See application file for complete search history.

(56) References Cited

U.S. PATENT DOCUMENTS

| | | | | |
|---|---|---|---|---|
| 5,729,702 A | * | 3/1998 | Creedon | G06F 13/364 710/107 |
| 7,353,259 B1 | * | 4/2008 | Bakke | G06F 9/44505 709/208 |
| 7,609,651 B1 | * | 10/2009 | McBride | G06F 3/0605 370/252 |
| 9,298,355 B1 | * | 3/2016 | Beausoleil | G06F 3/04842 |
| 2004/0073747 A1 | * | 4/2004 | Lu | G06F 3/0605 711/114 |
| 2005/0160150 A1 | * | 7/2005 | Kao | G06F 3/0605 709/212 |
| 2006/0117130 A1 | * | 6/2006 | Tsushima | G06F 9/45558 711/6 |

(Continued)

OTHER PUBLICATIONS

Nathan Evans, et al; Systems and Methods for Performing Application Container Introspection; U.S. Appl. No. 14/645,452, filed Mar. 12, 2015.

(Continued)

*Primary Examiner* — Emerson C Puente
*Assistant Examiner* — Zhi Chen
(74) *Attorney, Agent, or Firm* — FisherBroyles LLP

(57) ABSTRACT

A computer-implemented method for automated delivery and identification of virtual drives may include (1) creating a drive-template archive that contains a collection of virtual-drive templates, each of which contains a unique burned-in configuration identifier, (2) receiving, a provision request to provision a virtual drive for a requesting virtual machine, (3) fulfilling the provision request by (A) creating a copy of an appropriate virtual-drive template that matches the specification of the provision request and (B) providing the copy of the appropriate virtual-drive template to the requesting virtual machine, and (4) utilizing, at the requesting virtual machine, the copy of the appropriate virtual-drive template in response to determining that the burned-in configuration identifier of the copy of the appropriate virtual-drive template corresponds to a drive configuration that fulfills the provision request. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2006/0218544 A1* | 9/2006 | Chakraborty | G06F 8/63 | 717/168 |
| 2006/0224821 A1* | 10/2006 | Chen | G06F 3/0626 | 711/103 |
| 2007/0189137 A1* | 8/2007 | Saito | G11B 20/10527 | 369/47.32 |
| 2007/0233872 A1* | 10/2007 | Yoshikawa | G06F 9/5055 | 709/226 |
| 2008/0034364 A1* | 2/2008 | Lam | G06F 8/63 | 718/1 |
| 2008/0080375 A1* | 4/2008 | Haruta | H04L 69/22 | 370/230 |
| 2013/0097597 A1* | 4/2013 | Gibson | G06F 8/61 | 717/177 |
| 2013/0227558 A1* | 8/2013 | Du | G06F 9/45558 | 718/1 |
| 2013/0346584 A1* | 12/2013 | Tameshige | G06F 9/5077 | 709/223 |
| 2015/0134903 A1* | 5/2015 | Goodman | G06F 3/0655 | 711/114 |
| 2015/0295792 A1* | 10/2015 | Cropper | H04L 67/10 | 709/226 |
| 2016/0055338 A1* | 2/2016 | Jeansonne | G06F 21/575 | 713/2 |

OTHER PUBLICATIONS

"VMware", http://www.vmware.com/, as accessed Jul. 27, 2015, (Jan. 25, 1999).

"DataCore", http://www.datacore.com/, as accessed Jul. 27, 2015, (Jan. 25, 1999).

"VMware Workstation 4.5", https://www.vmware.com/support/ws45/doc/disks_add_ws.html, as accessed Jul. 27, 2015, VMware, Inc., (Apr. 17, 2004).

"Creating Virtual Disks", http://www.datacore.com/SSV-Webhelp/Creating_Virtual_Disks.htm, as accessed Jul. 27, 2015, (Jun. 25, 2011).

* cited by examiner

SYSTEMS AND METHODS FOR AUTOMATED DELIVERY AND IDENTIFICATION OF VIRTUAL DRIVES

BACKGROUND

Virtualization of computing systems can allow individuals and/or organizations to gain tremendous flexibility in managing computing resources. By emulating multiple computing systems on the same physical hardware, one can reduce wasted processing cycles, execute files in isolated environments, or otherwise improve computing efficiency and security in general. In many examples of virtual computing systems, a user of a virtual machine may request virtual drive space. A system administrator may fulfill such requests by provisioning virtual disk drives to allow virtual machines to store and manipulate data. In some examples of a virtualized computing environment, various virtual drives may serve different purposes based on their configuration.

Unfortunately, traditional methods of provisioning virtual disk drives are cumbersome and prone to error. Multiple administrators may need to manually configure drives, virtual machines, software, and/or physical hardware before a virtual machine can properly access a virtual disk drive. Furthermore, administrators involved in the configuration process may need to confirm various settings through "handshakes," further complicating the process. Such manual configuration and handshaking may introduce errors that result in delayed and/or incorrect provisioning of virtual disk drives to a requesting virtual machine. Accordingly, the instant disclosure identifies and addresses a need for improved systems and methods for the automated delivery and identification of virtual drives.

SUMMARY

As will be described in greater detail below, the instant disclosure describes various systems and methods for automated delivery and identification of virtual drives by providing virtual-drive templates to requesting virtual machines. Each virtual-drive template may contain a configuration identifier that the requesting virtual machine can use to confirm the configuration of the virtual drive without requiring an administrative handshake.

For example, a computer-implemented method for automated delivery and identification of virtual drives may include (1) creating a drive-template archive that includes a collection of virtual-drive templates, each of which contains a burned-in configuration identifier, (2) receiving a provision request to provision a virtual drive for a requesting virtual machine, the provision request identifying at least one specification of the virtual drive, (3) fulfilling the provision request by (A) creating a copy of an appropriate virtual-drive template that matches the specification of the provision request and (B) providing the copy of the appropriate virtual-drive template to the requesting virtual machine, and (4) utilizing, at the requesting virtual machine, the copy of the appropriate virtual-drive template in response to determining that the burned-in configuration identifier of the copy of the appropriate virtual-drive template corresponds to a drive configuration that fulfills the provision request. In one embodiment, the step of fulfilling the provision request occurs automatically without manual intervention and in response to receiving the provision request.

In some examples, creating the drive-template archive may additionally include generating a configuration ontology list that describes the configuration of each virtual-drive template. The configuration ontology list may be provided to a requesting entity before the requesting entity issues the provision request.

In one embodiment, the burned-in configuration identifier is written to a predetermined sector of the virtual drive template. Additionally or alternatively, the burned-in configuration identifier may be associated with an infrastructure administrator that manages the drive-template archive.

In some examples, fulfilling the provision request may include (1) determining that the drive-template archive does not contain virtual-drive templates that match the specification of the provision request, (2) generating a new virtual-drive template that matches the specification of the provision request, (3) tagging the new virtual-drive template with a new burned-in configuration identifier that identifies the configuration of the new virtual-drive template, and (4) utilizing the new virtual-drive template as the appropriate virtual-drive template that matches the specification of the provision request.

In some examples, utilizing the copy of the appropriate virtual-drive template may include configuring the copy of the appropriate virtual-drive template into a complete virtual drive. Moreover, utilizing the copy of the appropriate virtual-drive template may include providing the burned-in configuration identifier to an application running on the requesting virtual machine.

In one embodiment, a system for implementing the above-described method may include (1) a creation module, stored in memory, that creates a drive-template archive that includes a collection of virtual-drive templates, each of which contains a burned-in configuration identifier, (2) a receiving module, stored in memory, that receives a provision request to provision a virtual drive for a requesting virtual machine, the provision request identifying at least one specification of the virtual drive, (3) a fulfilling module, stored in memory, that fulfils the provision request by (A) creating a copy of an appropriate virtual-drive template that matches the specification of the provision request and (B) providing the copy of the appropriate virtual-drive template to the requesting virtual machine, (4) a utilizing module, stored in memory, that utilizes, at the requesting virtual machine, the copy of the appropriate virtual-drive template in response to determining that the burned-in configuration identifier of the copy of the appropriate virtual-drive template corresponds to a drive configuration that fulfills the provision request, and (5) at least one physical processor configured to execute the creation module, the receiving module, the fulfilling module, and the utilizing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) create a drive-template archive that includes a collection of virtual-drive templates, each of which contain a burned-in configuration identifier, (2) receive a provision request to provision a virtual drive for a requesting virtual machine, the provision request identifying at least one specification of the virtual drive, (3) fulfill the provision request by (A) creating a copy of an appropriate virtual-drive template that matches the specification of the provision request and (B) providing the copy of the appropriate virtual-drive template to the requesting virtual machine, and (4) utilize, at the requesting virtual machine, the copy of the appropriate virtual-drive template in response to determining that the burned-in configuration identifier of the copy of the appropriate virtual-drive template corresponds to a drive configuration that fulfills the provision request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
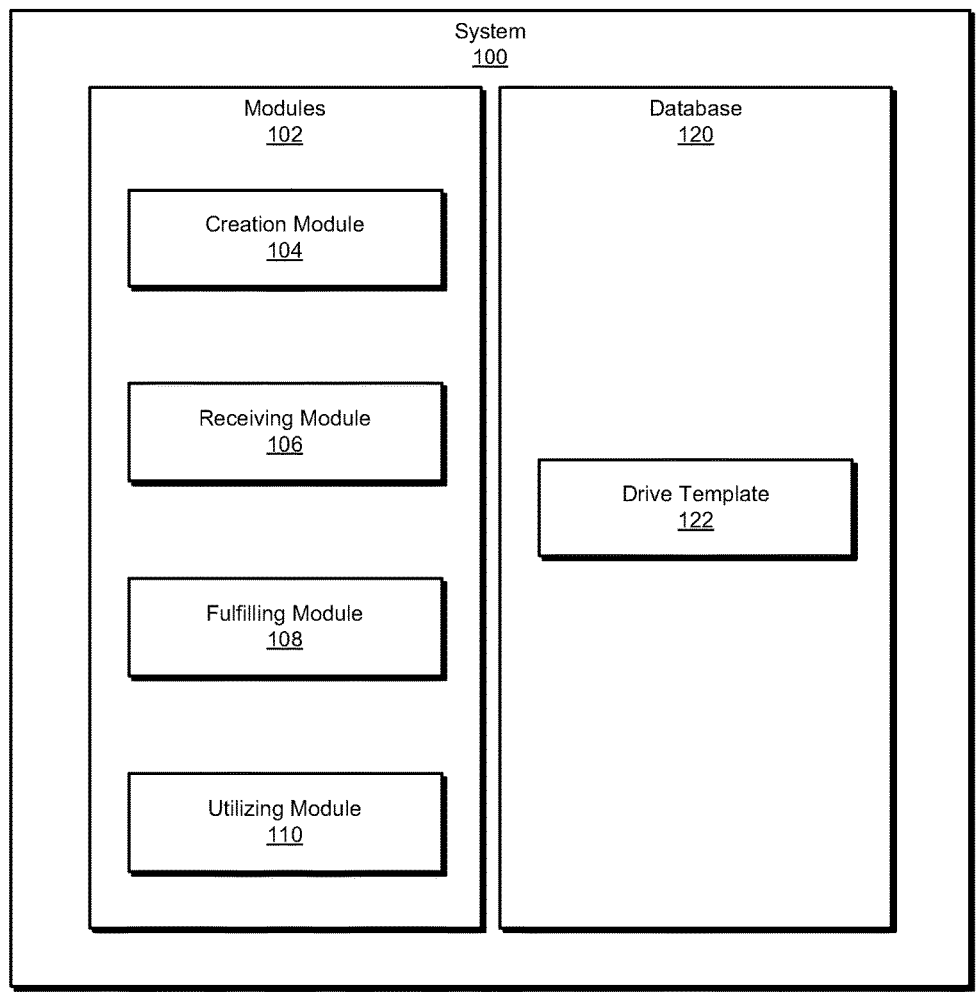
FIG. 1 is a block diagram of an exemplary system for automated delivery and identification of virtual drives.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automated delivery and identification of virtual drives. As will be explained in greater detail below, encoding virtual drives and/or virtual-drive templates with configuration identifiers may allow virtualization systems to automatically provision virtual drives for virtual machines, and for virtual machines to automatically identify and utilize virtual drives provisioned to them.

Figure 2:
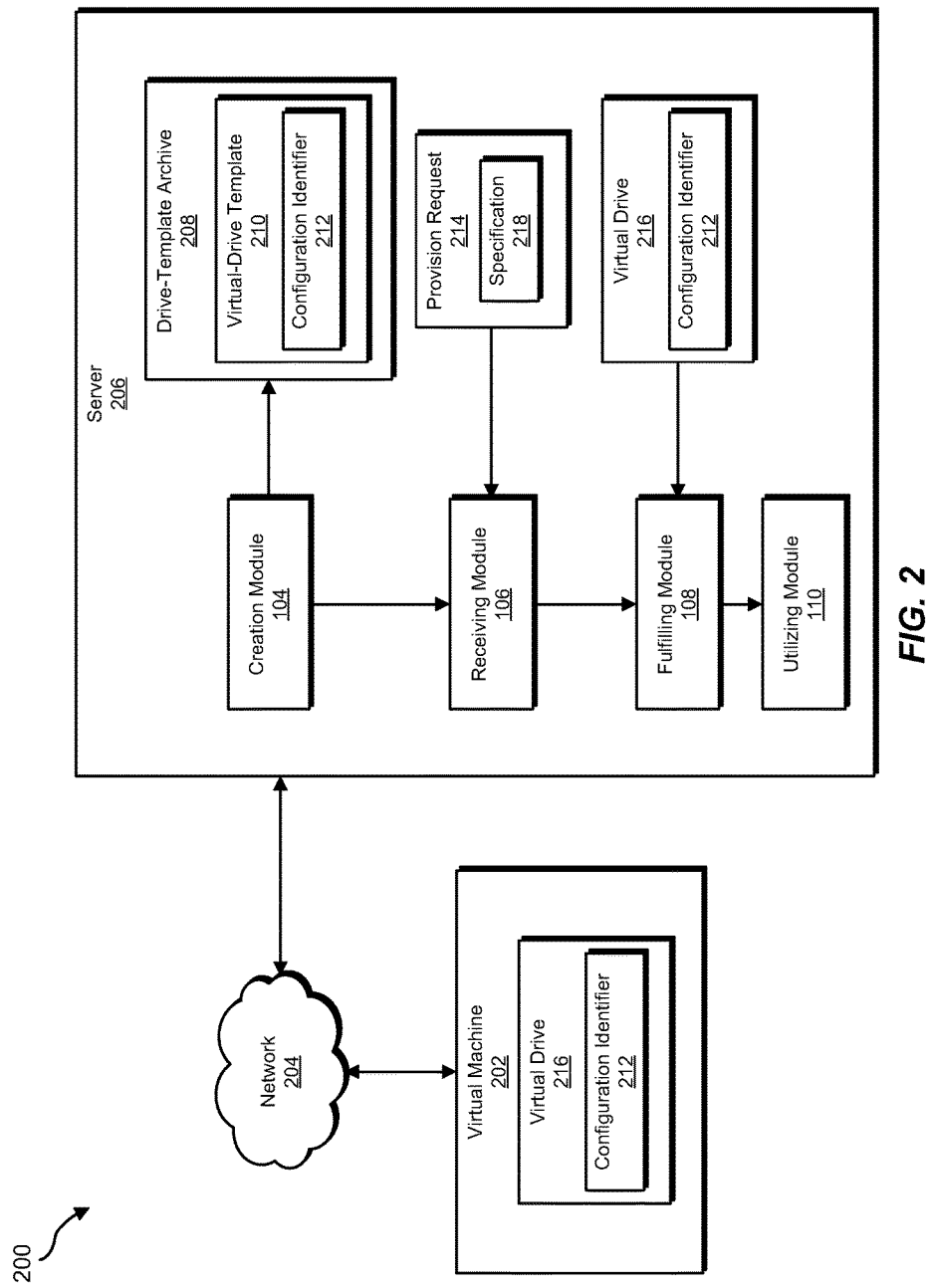
FIG. 2 is a block diagram of an additional exemplary system for automated delivery and identification of virtual drives.

The following will provide, with reference to FIGS. 1-2, detailed descriptions of exemplary systems for automated delivery and identification of virtual drives. Detailed descriptions of corresponding computer-implemented methods will also be provided in connection with FIG. 3. Further detailed descriptions of exemplary systems for automated delivery and identification of virtual drives will be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for automated delivery and identification of virtual drives. As illustrated in this figure, exemplary system 100 may include one or more modules 102 for performing one or more tasks. For example, and as will be explained in greater detail below, exemplary system 100 may include a creation module 104 that creates a drive-template archive that includes a collection of virtual-drive templates, each of which contains a burned-in configuration identifier. Exemplary system 100 may additionally include a receiving module 106 that receives a provision request to provision a virtual drive for a requesting virtual machine. Exemplary system 100 may further include a fulfilling module 108 that fulfills the provision request by creating a copy of an appropriate virtual-drive template and providing the copy of the appropriate virtual-drive template to the requesting virtual machine. Furthermore, exemplary system 100 may include a utilizing module 110 that utilizes, at the requesting virtual machine, the copy of the appropriate virtual-drive template in response to determining that the burned-in configuration identifier of the copy of the appropriate virtual-drive template corresponds to a drive configuration that fulfills the provision request. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., virtual machine 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may include one or more databases, such as database 120. In one example, database 120 may be configured to store drive template 122. Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a virtual machine 202 in communication with a server 206 via a network 204. In one example, virtual machine 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of virtual machine 202 and/or server 206, enable virtual machine 202 and/or server 206 to create self-identifying virtual-drive templates. Virtual machine 202 and/or server 206 may then provide these templates to virtual machines that issue a provision request for a virtual drive. As will be described in greater detail below, one or more of modules 102 may cause virtual machine 202 and/or server 206 to automatically deliver and identify virtual drives. For example, creation module 104 may create a drive-template archive 208 that may include a plurality of virtual-drive templates, each of which contains a burned-in configuration identifier 212. Receiving module 106 may receive a provision request 214 to provision a virtual drive 216 for virtual machine 202. Provision request 214 identifies at least one specification 218 of virtual drive 216. Fulfilling module 108 may then fulfill provision request 214 by creating a copy of an appropriate virtual-drive template, such as virtual-drive template 210, that matches specification 218 of provision request 214. Fulfilling module 108 may provide the copy of virtual-drive template 210 to requesting virtual machine 202. Utilizing module 110 may utilize, at requesting virtual machine 202, the copy of appropriate virtual-drive template 210 in response to determining that burned-in configuration identifier 212 of the copy of appropriate virtual-drive template 210 corresponds to a drive configuration that fulfills provision request 214.

Server 206 generally represents any type or form of computing device that is capable of serving virtual drives to virtual machines. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. Network 204 is not necessarily a physical network. In some examples, network 204 may be a virtual network that connects multiple virtual machines and/or other virtualized computing systems such as virtual drives, virtual routers, etc. In some embodiments, network 204 may facilitate communication between virtual machine 202 and server 206.

Virtual machine 202 generally represents any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer. In some examples, virtual machines are referred to as "guests" and the virtual machine manager that manages the virtual machines is referred to as a "host." Virtual machines may access and/or request access to various forms of media, including virtual drives such as virtual drive 216.

Although illustrated as separate blocks in FIG. 2, virtual machine 202 and server 206 may exist on the same physical hardware. For example, server 206 may run a hypervisor that hosts virtual machine 202, and virtual machine 202 may be connected to modules 102 through a virtual network. Additionally or alternatively, virtual machine 202 and server 206 may exist on separate physical hardware that is connected through network 204.

Virtual drive 216 generally represents any type or form of data storage that is abstracted from the underlying physical storage medium. Such abstraction may be accomplished by virtualization management software such as VSPHERE. Moreover, virtual drive 216 may take a variety of forms. For example, virtualization management software may represent virtual drive 216 to a virtual machine host as a file. The host may then permit various virtual machines to read from and/or write to the file. From the point of view of a virtual machine, the file representing a virtual drive may be indistinguishable from a physical storage device. Additionally, virtual drive 216 may utilize a variety of underlying hardware. For example, virtual drive 216 may exist on a physical hard drive disk. Alternatively, virtual drive 216 may exist as a RAM drive and store data in random access memory. Regardless of the form taken by virtual drive 216, it may contain various read/write sectors that can be uniquely identified according to memory address.

Figure 3:
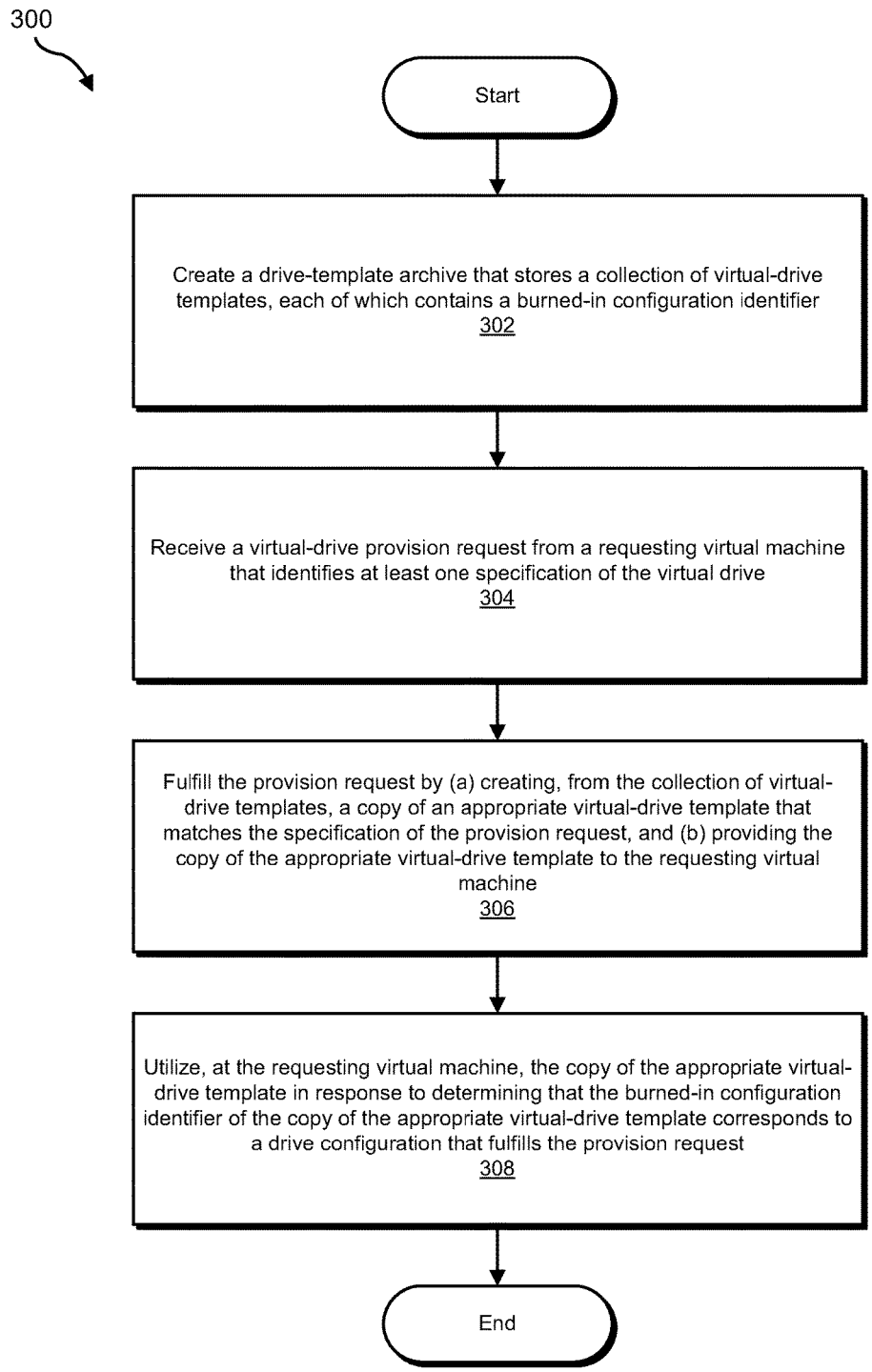
FIG. 3 is a flow diagram of an exemplary method for automated delivery and identification of virtual drives.

FIG. 3 is a flow diagram of an exemplary computer-implemented method 300 for automated delivery and identification of virtual drives. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may create a drive-template archive that contains a collection of virtual-drive templates, each of which contains a different burned-in configuration identifier. For example, creation module 104 may, as part of server 206 in FIG. 2, create drive-template archive 208 that contains a collection of virtual-drive templates, including virtual-drive template 210. Each virtual-drive template in drive-template archive 208 may contain a burned-in configuration identifier. In the illustrated example, virtual-drive template 210 contains burned-in configuration identifier 212.

Creation module 104 may create drive-template archive 208 in a variety of contexts. For example, creation module 104 may create drive-template archive 208 as part of a single virtual machine host in order to enable the host to provision virtual drives to virtual machines managed by the host. Additionally or alternatively, creation module 104 may create all or a part of drive-template archive 208 as part of a server that enables automated virtual-drive provisioning for multiple hosts on a network. As part of creating virtual-drive templates for drive-template archive 208, creation module 104 may write configuration identifiers to each template.

The term "configuration identifier," as used herein, generally refers to a method of encoding information that describes the configuration and/or purpose of a virtual drive directly into the virtual drive itself such that software and/or computing systems external to the virtual drive can read the configuration and/or purpose information from the virtual drive. The configuration identifier may be a hash based on the ontology of the drive, a drive configuration identifier that is not shared by any other virtual-drive templates, a unique drive identifier that is modified for each copy of a virtual-drive template, a text string (e.g., "ApplicationXYZ_Log"), or any other suitable encoding of configuration information. As will be described in greater detail below, systems and methods described herein may map configuration identifiers to other information about a virtual drive.

In some embodiments, creation module 104 may write the burned-in configuration identifier to a predetermined sector or memory address of the virtual drive template. As described above, a virtual drive may contain drive sectors analogous to those found on a physical storage device. These sectors may be uniquely identifiable by a virtual machine that accesses the virtual drive. As such, creation module 104 may write the burned-in configuration identifier to parallel drive sectors for each virtual-drive template. As a specific example, creation module 104 may write configuration identifiers to the 0x404 sector of each virtual-drive template. As will be described in greater detail below, consistently writing configuration identifiers to the same sector of each virtual-drive template may enable virtual machines to identify virtual drives without the need for manual intervention.

Figure 4:
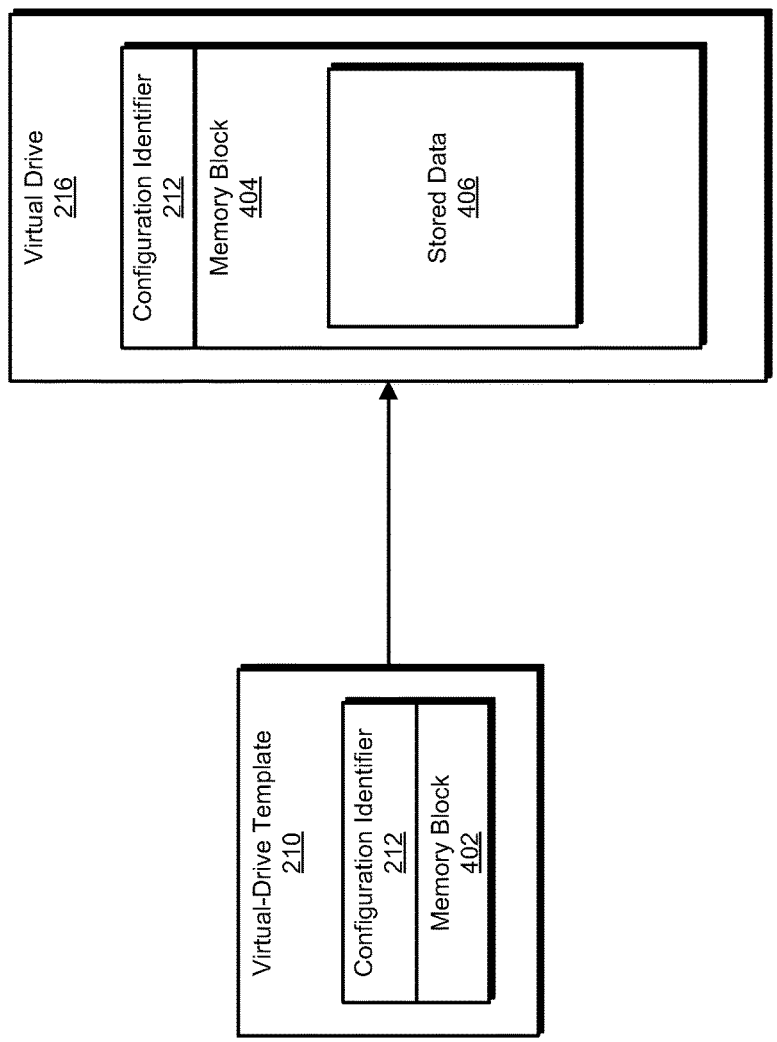
FIG. 4 is a block diagram of an exemplary computing system for automated delivery and identification of virtual drives.

An illustrated example of a configuration identifier in the context of a virtual drive is provided in connection with FIG. 4. Creation module may create virtual-drive template 210 with configuration identifier 212 such that configuration identifier 212 is written to the 0x404 sector of the virtual drive. Virtual-drive template 210 may also contain a memory block 402 that may be used by virtual machines to store data. When a virtual machine utilizes a copy of virtual-drive template 210 as virtual drive 216, configuration identifier 212 will still be located at the 0x404 sector of the drive. Systems and applications can read this sector in order to retrieve the configuration identifier of virtual-drive template 210 and/or virtual drive 216.

As outlined briefly above, the systems and methods described herein may use configuration identifiers to look up further information about a virtual drive and/or virtual-drive template. Creation module 104 may create such a lookup table as part of creating drive-template archive 208. For example, creation module 104 may create a configuration ontology list that describes the configuration of each virtual-drive template. Creation module 104 may then associate configuration identifiers with attributes that describe the configuration of the associated drive. Examples of attributes include, without limitation, "RAM drive", "high throughput drive", "logging drive", "caching drive", etc. Furthermore, creation module 104 may also include in the configuration ontology list information about an administrator responsible for configuring virtual-drive templates. For example, creation module 104 may associate configuration identifiers with a user ID of an infrastructure administrator that manages the drive-template archive. The ontology list may thus contain entries such as "Drive Configuration ID: 1; Administrator: John Smith; high throughput logging drive".

Creation module 104 may provide the above-described configuration ontology list to a virtual machine before the virtual machine issues a provision request. As will be described in greater detail below, virtual machines may use this ontology list as part of issuing drive provisioning requests. The term "drive provisioning request," as used herein, generally refers to a request to assign a virtual machine access to a virtual drive.

In some cases, creation module 104 may create multiple virtual-drive template archives. For example, an organization may have multiple departments that each have differing needs for virtual drives. A system administrator for such an organization may direct creation module 104 to create a separate virtual-drive template archive for each department. Additionally or alternatively, creation module 104 may create a different drive-template archive for each system administrator. Creation module 104 may identify the administrator responsible for a particular drive-template archive through metadata associated with the archive and/or through entries in a configuration ontology list associated with the archive.

At step 304 in FIG. 3, one or more of the systems described herein may receive a provision request to provision a virtual drive for a requesting virtual machine. The provision request may identify at least one specification of the virtual drive. For example, receiving module 106 may, as part of server 206 in FIG. 2, receive provision request 214 from requesting virtual machine 202 for a virtual drive 216. Provision request 214 may identify at least one specification 218 for virtual drive 216.

Receiving module 106 may receive provision request 214 in a variety of contexts. For example, a user of virtual machine 202 may cause virtual machine 202 to issue provision request 214. Additionally or alternatively, receiving module 106 may receive provision request 214 from an application running on virtual machine 202. In further examples, receiving module 106 may receive provision request 214 from a hypervisor that hosts virtual machine 202. Moreover, receiving module 106 may receive provision request 214 from a person, such as a system administrator, rather than a software component. As will be described in greater detail below, provision request 214 may contain information, such as specification 218, that may allow one or more of modules 102 to select and deliver an appropriate virtual-drive template to virtual machine 202.

As described in greater detail above, creation module 104 may provide a configuration ontology list to virtual machine 202 and/or a relevant host system. Users and/or software operating on virtual machine 202 and/or the host system may use the configuration ontology list in a variety of ways. For example, a virtual machine may request a specific virtual-drive template by specifying a configuration identifier in specification 218 of provision request 214. As a specific example, virtual machine 202 may request a bulk-storage virtual drive. Software on virtual machine 202 may search the configuration ontology list for a bulk-storage virtual drive. The software may then provide the configuration identifier to receiving module 106 as specification 218 of provision request 214. As will be described in greater detail below, fulfilling module 108 may accordingly provide a copy of the virtual-drive template with the configuration identifier to virtual machine 202.

Additionally or alternatively, receiving module 106 may receive a more general provision request for a virtual drive. For example, virtual machine 202 may request, via specification 218 of provision request 214, a virtual-drive template by ontology rather than configuration identifier. As a specific example of a generalized request, receiving module 106 may receive a provision request for a "logging drive" from virtual machine 202. One or more of modules 102 may accordingly search drive-template archive 208 for a virtual-drive template that is associated with the "logging drive" ontology and provide a copy of the template to virtual machine 202. In some examples, one or more of modules 102 may provide a list of virtual-drive templates that may fulfill provision request 214 to the requesting virtual machine. In such examples, the requesting virtual machine may ask the software that originated the provision request to select the desired virtual-drive configuration from the provided list. Although the examples provided herein describe situations in which modules 102 receive provision request 214 from virtual machine 202, modules 102 may receive provision request 214 from a variety of sources, as described above.

At step 306 in FIG. 3, one or more of the systems described herein may fulfill the provision request by creating a copy of an appropriate virtual-drive template that matches the specification of the provision request and providing the copy of the appropriate virtual-drive template to the requesting virtual machine. For example, fulfilling module 108 may, as part of server 206 in FIG. 2, fulfill provision request 214 by creating a copy of virtual-drive template 210 that matches specification 218 of provision request 214 and providing the copy of appropriate virtual-drive template 210 to requesting virtual machine 202.

Fulfilling module 108 may fulfill provision request 214 in a variety of ways. In one embodiment, fulfilling module 108 may automatically fulfill provision request 214 in response to receiving the provision request. For example, receiving module 106 may receive a provision request that contains a request for a virtual-drive template with a particular configuration identifier. In such an example, fulfilling module 108 may simply create a copy of the virtual-drive template with a matching configuration identifier and provide the copy to the requesting virtual machine.

Additionally or alternatively, receiving module 106 may receive a provision request that specifies ontologies that the requested drive should be associated with (e.g., "logging drive"). Fulfilling module 108 may then query drive-template archive 208 and/or an appropriate ontology list in order to identify a virtual-drive template that matches the specification of the provision request.

In some examples, receiving module 106 may receive a provision request that specifies a drive of a type that does not yet exist in drive-template archive 208. In such examples, fulfilling module 108 may nevertheless fulfill the provision request by configuring a new virtual-drive template that matches the specification of the provision request and tagging the new virtual-drive template with a new burned-in configuration identifier that identifies the configuration of the new virtual-drive template. Fulfilling module 108 may then provide this newly configured virtual-drive template to the requesting system in response to receiving provision request 214. As a specific example of this scenario, drive-template archive 208 may contain a single virtual-drive template with the configuration ontology, "storage drive". Receiving module 106 may receive provision request 214 from virtual machine 202, where specification 218 specifies that the requested virtual drive should have the configuration ontology, "logging drive". Fulfilling module 108 may accordingly create and configure a new virtual-drive template with the ontology, "logging drive", and provide this newly created logging-drive template to virtual machine 202 in order to fulfill provision request 214.

Additionally, fulfilling module 108 may modify the burned-in configuration identifier based on information contained within the provision request. For example, receiving module 106 may receive provision request 214. Specification 218 of provision request 214 may indicate that provision request 214 requests a storage drive for "Application XYZ." In such an example, fulfilling module 108 may create a copy of an appropriate virtual-drive template and then modify the configuration identifier of the copy of the virtual-drive template to indicate that the provisioned virtual drive is destined for use by "Application XYZ." An illustrated example is provided below in connection with FIG. 5.

At step 308, one or more of the systems described herein may utilize, at the requesting virtual machine, the copy of the appropriate virtual-drive template in response to determining that the burned-in configuration identifier of the copy of the appropriate virtual-drive template corresponds to a drive configuration that fulfills the provision request. For example, utilizing module 110 may, as part of server 206 in FIG. 2, utilize the copy of appropriate virtual-drive template 210 as virtual drive 216 in response to determining that burned-in configuration identifier 212 of the copy of appropriate virtual-drive template 210 corresponds to a drive configuration that fulfills provision request 214.

Utilizing module 110 may perform a variety of actions as part of utilizing the virtual-drive template at the virtual machine. For example, utilizing module 110 may configure the copy of the appropriate virtual-drive template into a complete virtual drive. In some embodiments, a virtual-drive template may be a very small virtual drive that can later be duplicated and/or resized according to the provision request and/or the needs of the software that is consuming the virtual drive. In these embodiments, utilizing module 110 may resize a virtual-drive template into a full virtual drive either before or after providing the requesting virtual machine and/or software with access to the virtual drive. As an additional example, virtual-drive templates may encode a flag as part of the configuration identifier that designates the virtual drive as a template drive. Utilizing module 110 may "flip" this flag to indicate that the virtual drive is no longer a template and can be modified in accordance with provision requests.

In some examples, utilizing module 110 may provide the burned-in configuration identifier to an application running on the requesting virtual machine. As will be described in connection with FIG. 5, applications, operating systems, virtual machines, hypervisors, or any other virtualization solution may utilize the configuration identifier as part of identifying and subsequently utilizing the virtual drive in accordance with its designated purpose.

Figure 5:
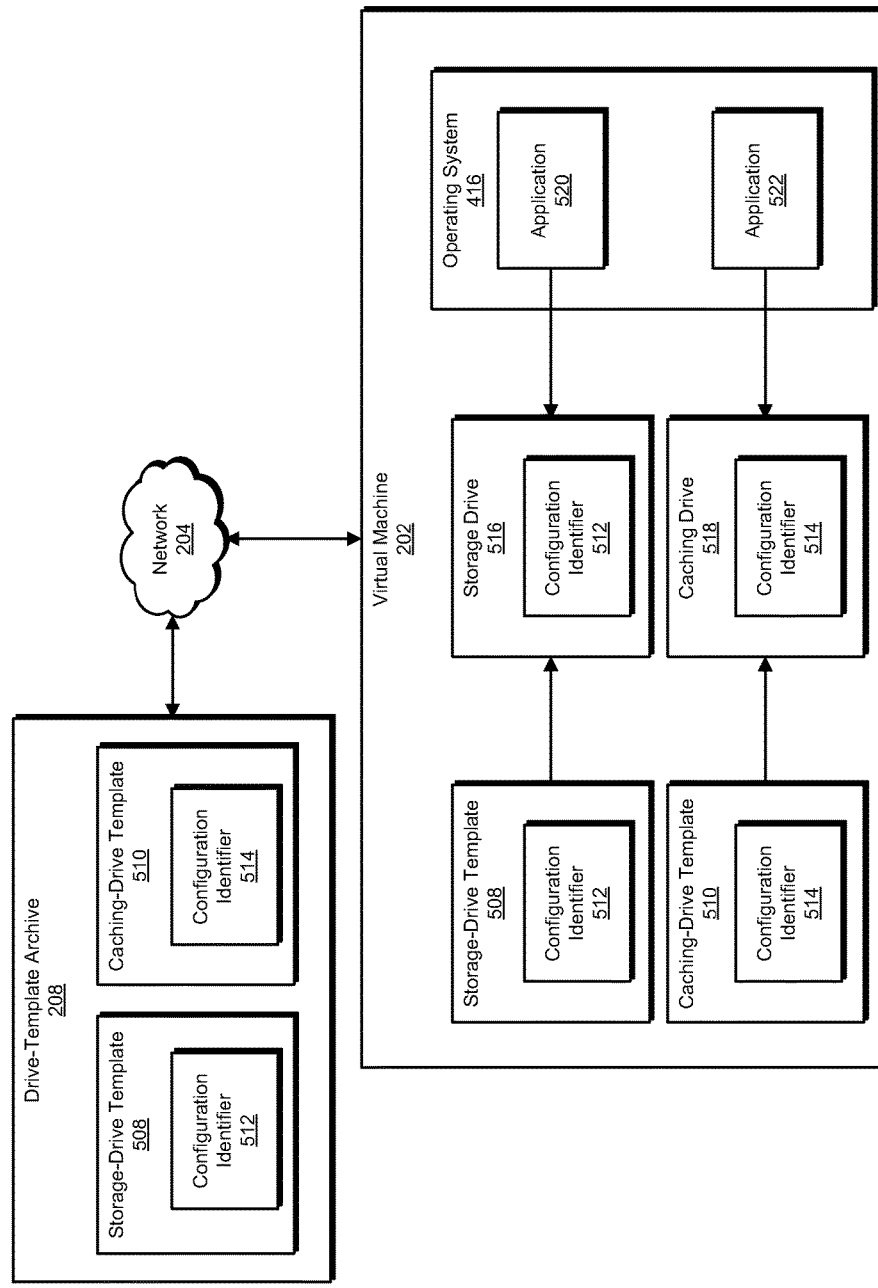
FIG. 5 is a block diagram of an exemplary computing system for automated delivery and identification of virtual drives.

FIG. 5 is an illustration of an exemplary system for automatically fulfilling virtual-drive provision requests. As illustrated in FIG. 5, virtual machine 202 may be in communication with drive-template archive 208 via network 204. Creation module 104 may have created and stored in drive-template archive 208 a storage-drive template 508, encoded with configuration identifier 512, and a caching-drive template 510, encoded with configuration identifier 514. Storage-drive template 508 and caching-drive template 510 generally represent virtual-drive templates for storage drives and caching drives, respectively. Applications running on an operating system 416 on virtual machine 202 may issue provision requests for specialized virtual drives, which may then be fulfilled by one or more of modules 102.

In the example of FIG. 5, an application 520 may issue a provision request (e.g., provision request 214 in FIG. 2) for a virtual storage drive. Modules 102 may identify a specification of the request, in this case the ontology, "storage drive", and provide a copy of the appropriate template to virtual machine 202. As illustrated in FIG. 2, fulfilling module 108 may fulfill the request by providing a copy of storage-drive template 508 to virtual machine 202. As will be described in greater detail below, the copy of storage-drive template 508 may be converted into storage drive 516 for use by application 520.

Similarly, an additional application such as application 520 in FIG. 5 may request a different type of virtual drive. As illustrated, application 522 may request a caching drive. Modules 102 may receive the provision request and fulfill the request by providing a copy of caching-drive template 510 to virtual machine 202. This copy of caching-drive template 510 may be converted into caching drive 518 for use by application 522.

As outlined above, fulfilling module 108 may modify the configuration identifier of a virtual-drive template based on information contained within the received provision request. As illustrated in FIG. 5, application 520 requested storage drive 516 from modules 102. In this example, fulfilling module 108 may create the copy of storage-drive template 508 and then modify the configuration identifier of storage-drive template 508 to reflect that storage-drive template 508 (and by extension, storage drive 516) are destined for use by application 520. As a specific example, storage-drive template 508 may contain a configuration identifier in the form of a text string, such as "Storage." Fulfilling module 108 may modify the configuration identifier of the copy of storage-drive template 508 that is destined for use as storage drive 516 by appending information to this identifier. In the example of FIG. 5, fulfilling module 108 may change the configuration identifier to "Storage-Application 520" to indicate that this particular copy of storage-drive template 508 is intended for use by application 520.

In both of the above-described examples, virtual machine 202, operating system 416, application 520, application 522, or combinations of one or more of the same may identify the configuration of a particular virtual drive by reading the configuration identifier embedded in the virtual drive. As described in greater detail above, utilizing module 110 may facilitate such identification through the use of a configuration ontology list that maps configuration identifiers to capabilities possessed by drives with a particular configuration identifier (e.g., all drives with configuration identifier "CFLOG" are logging drives, all drives with configuration identifier "CFCACHE" are caching drives, etc.). Utilizing module 110 may additionally or alternatively read the configuration of a virtual drive 216 directly through the configuration identifier, or use any other suitable means of deriving the configuration of a virtual drive through the configuration identifier. Once utilizing module 110 has identified the configuration of a virtual drive, utilizing module 110 may then allow virtual machines, operating systems, applications, and/or any other suitable computing system and/or software to access and consume the virtual drive.

As described above, the systems and methods described herein may enable automated provisioning and identification of virtual drives through the use of preconfigured virtual-drive templates with burned-in configuration identifiers. Copies of these virtual-drive templates may be provided to requesting virtual machines and then expanded into full-sized virtual drives that the virtual machine may then consume. Software running within the virtual machine may automatically identify the virtual drive by reading the burned-in configuration identifier. By enabling systems and software to automatically identify a virtual drive, systems and methods described herein may eliminate cumbersome and error-prone manual administrative "handshake" processes found in traditional drive provisioning methods.

Figure 6:
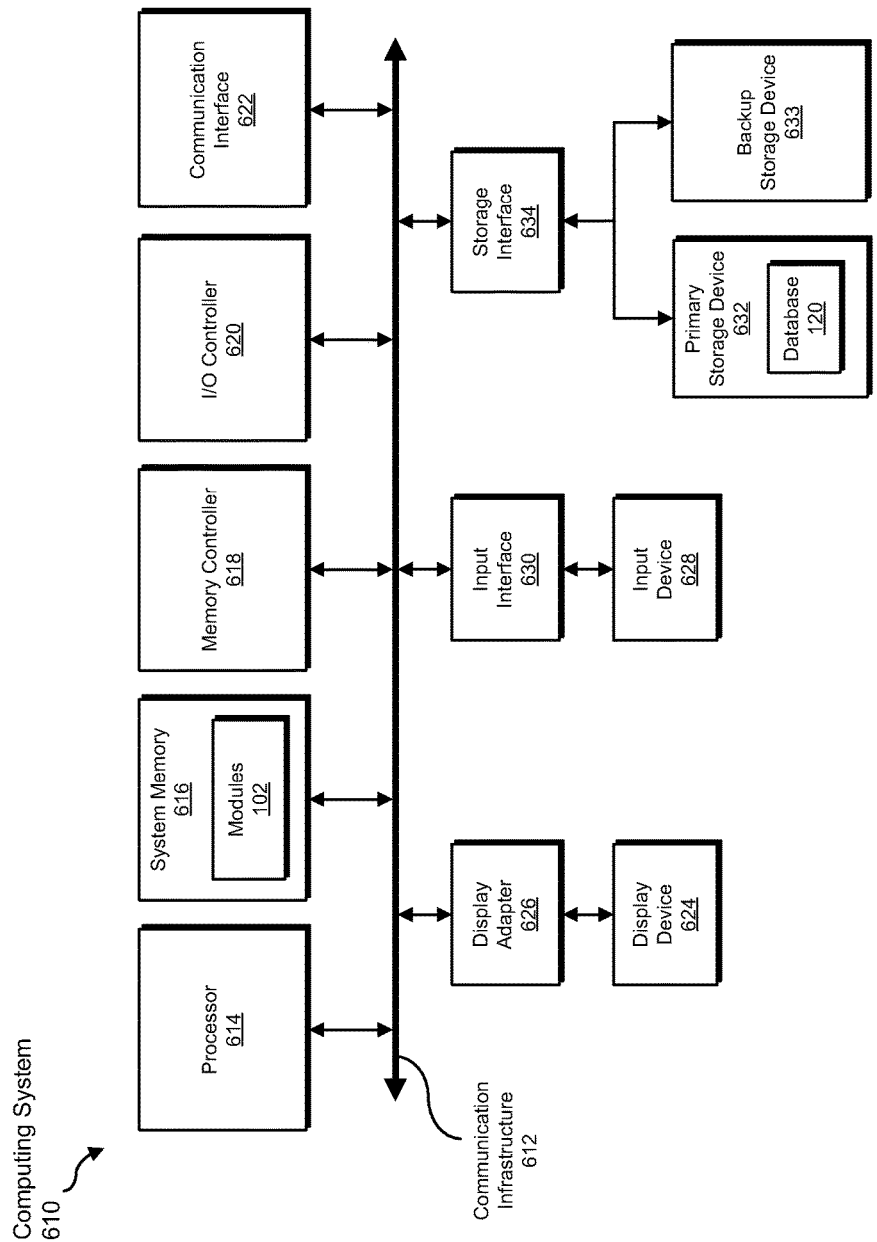
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
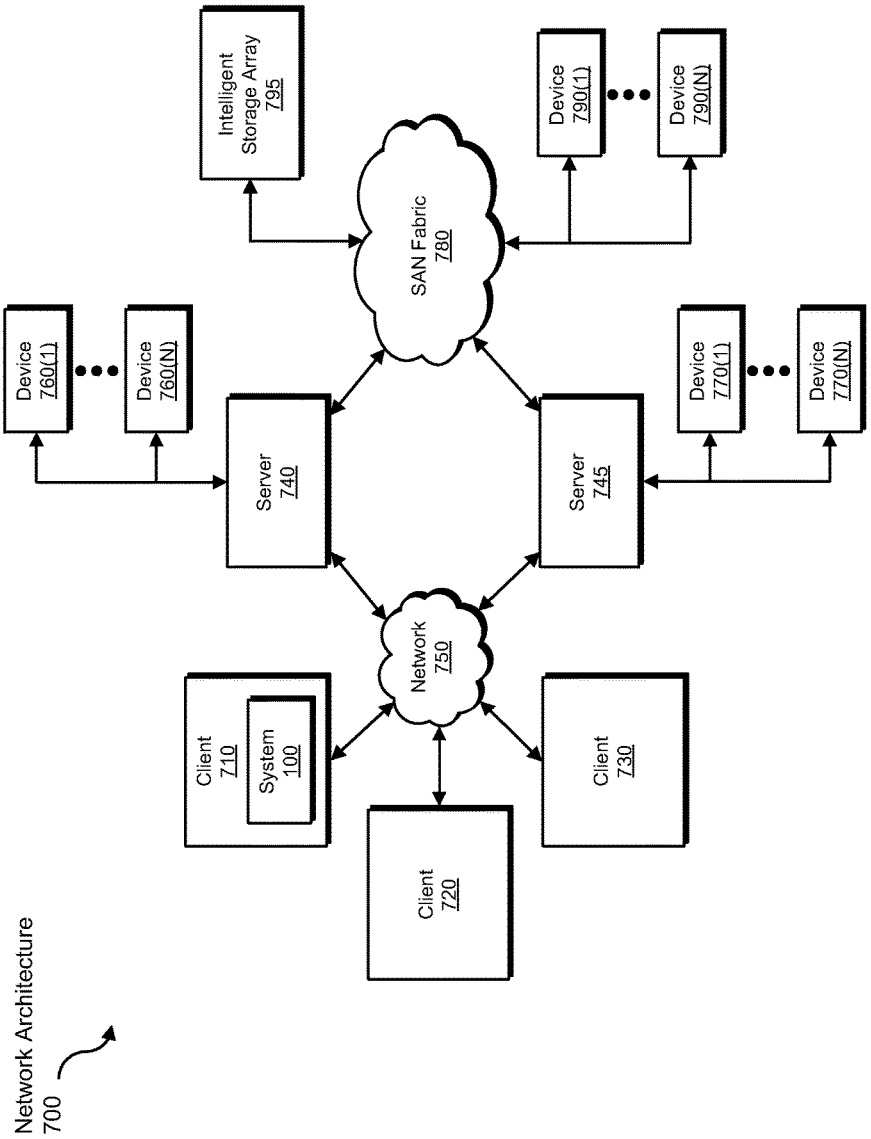
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for automated delivery and identification of virtual drives.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive virtual drive configuration information to be transformed, transform the configuration information into a virtual-drive template archive, receive a provision request for a virtual drive, identify a virtual-drive template that fulfills the request, transform the virtual-drive template into a virtual drive, and provide the transformed virtual drive to a virtual machine. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automated delivery and identification of virtual drives, at least a portion of the method being performed by a computing device comprising at least one processor, the method comprising:
   creating a drive-template archive that comprises a plurality of virtual-drive templates, each virtual-drive template comprising a burned-in configuration identifier that:
      includes information describing the configuration of the virtual-drive template;
      is encoded directly into the virtual-drive template such that systems external to the virtual-drive template are able to read the information describing the configuration of the virtual-drive template from the virtual-drive template; and
is not shared by any other virtual-drive template in the plurality of virtual-drive templates;
receiving, from a requesting application executing on a requesting virtual machine, a provision request to provision a virtual drive for the requesting virtual machine, the provision request identifying at least one configuration specification of the virtual drive;
in response to receiving the provision request, fulfilling the provision request by:
creating, from the plurality of virtual-drive templates, a copy of an appropriate virtual-drive template that matches the configuration specification of the provision request;
converting the copy of the appropriate virtual-drive template into a fulfilling virtual-drive template by modifying, based at least in part on identification information of the requesting application included in the provision request, the burned-in configuration identifier of the copy of the appropriate virtual-drive template to include the identification information of the requesting application, thereby indicating that the fulfilling virtual-drive template is intended to be utilized by the requesting application executing on the requesting virtual machine; and
providing the fulfilling virtual-drive template to the requesting virtual machine; and
utilizing, by the requesting application executing on the requesting virtual machine, the fulfilling virtual-drive template in response to determining, at the requesting virtual machine, that the information included within the burned-in configuration identifier of the fulfilling virtual-drive template indicates that the fulfilling virtual-drive template is intended to be utilized by the requesting application.

2. The method of claim 1, wherein creating the drive-template archive further comprises generating a configuration ontology list that describes the configuration of each virtual-drive template.

3. The method of claim 2, further comprising providing the configuration ontology list to the requesting virtual machine before the requesting virtual machine issues the provision request.

4. The method of claim 1, wherein the step of fulfilling the provision request occurs automatically without manual intervention and in response to receiving the provision request.

5. The method of claim 1, wherein the burned-in configuration identifier is written to a predetermined sector of the virtual drive template.

6. The method of claim 1, wherein the burned-in configuration identifier is associated with an infrastructure administrator that manages the drive-template archive.

7. The method of claim 1, wherein utilizing the fulfilling virtual-drive template comprises configuring the fulfilling virtual-drive template into a complete virtual drive.

8. The method of claim 1, wherein utilizing the fulfilling virtual-drive template comprises providing the modified burned-in configuration identifier to the requesting application.

9. The method of claim 1, wherein fulfilling the provision request further comprises:
determining that the drive-template archive does not contain virtual-drive templates that match the specification of the provision request;
generating a new virtual-drive template that matches the specification of the provision request;
tagging the new virtual-drive template with a new burned-in configuration identifier that identifies the configuration of the new virtual-drive template; and
providing the new virtual-drive template as an appropriate virtual-drive template that matches the configuration specification of the provision request.

10. A system for automated delivery and identification of virtual drives, the system comprising:
a creation module, stored in a memory, that creates a drive-template archive that comprises a plurality of virtual-drive templates, each virtual-drive template comprising a burned-in configuration identifier that:
includes information describing the configuration of the virtual-drive template; is encoded directly into the virtual-drive template such that systems external to the virtual-drive template are able to read the information describing the configuration of the virtual-drive template from the virtual-drive template; and
is not shared by any other virtual-drive template in the plurality of virtual-drive templates;
a receiving module, stored in the memory, that receives, from as requesting application executing on a requesting virtual machine, a provision request to provision a virtual drive for the requesting virtual machine, the provision request identifying at least one configuration specification of the virtual drive;
a fulfilling module, stored in the memory, that, in response to the receiving module receiving the provision request, fulfils the provision request by:
creating, from the plurality of virtual-drive templates, a copy of an appropriate virtual-drive template that matches the configuration specification of the provision request;
converting the copy of the appropriate virtual-drive template into a fulfilling virtual-drive template by modifying, based at least in part on identification information of the requesting application included in the provision request, the burned-in configuration identifier of the copy of the appropriate virtual-drive template to include the identification information of the requesting application, thereby indicating that the fulfilling virtual-drive template is intended to be utilized by the application executing on the requesting virtual machine; and
providing the fulfilling virtual-drive template to the requesting virtual machine;
a utilizing module, stored in the memory, that utilizes, by the requesting application executing on the requesting virtual machine, the fulfilling virtual-drive template in response to determining, at the requesting virtual machine, that the information included within the burned-in configuration identifier of the fulfilling virtual-drive template indicates that the fulfilling virtual-drive template is intended to be utilized by the requesting application; and
at least one physical computer processor configured to execute the creation module, the receiving module, the fulfilling module, and the utilizing module.

11. The system of claim 10, wherein the creation module creates the drive-template archive at least in part by generating a configuration ontology list that describes the configuration of each virtual-drive template.

12. The system of claim 11, wherein the creation module provides the configuration ontology list to the requesting virtual machine before the requesting virtual machine issues the provision request.

13. The system of claim 10, the fulfilling module fulfills the provision request automatically without manual intervention and in response to receiving the provision request.

14. The system of claim 10, wherein the creation module writes the burned-in configuration identifier to a predetermined sector of the virtual drive template.

15. The system of claim 10, wherein the creation module associates the burned-in configuration identifier with an infrastructure administrator that manages the drive-template archive.

16. The system of claim 10, wherein the utilizing module utilizes the fulfilling virtual-drive template by configuring the fulfilling virtual-drive template into a complete virtual drive.

17. The system of claim 10, wherein the utilizing module utilizes the fulfilling virtual-drive template by providing the modified burned-in configuration identifier to the requesting application.

18. The system of claim 10, wherein the fulfilling module fulfils the provision request by:
  determining that the drive-template archive does not contain virtual-drive templates that match the specification of the provision request;
  generating a new virtual-drive template that matches the specification of the provision request;
  tagging the new virtual-drive template with a new burned-in configuration identifier that identities the configuration of the new virtual-drive template; and
  provides the new virtual-drive template to the requesting virtual machine as an appropriate virtual-drive template that matches the configuration specification of the provision request.

19. A non-transitory computer-readable medium comprising one or more computer-readable instructions that, when executed by at least one processor of a computing device, cause the computing device to:
  create a drive-template archive that comprises a plurality of virtual-drive templates, each virtual-drive template comprising a burned-in configuration identifier that:
    includes information describing the configuration of the virtual-drive template;
    is encoded directly into the virtual-drive template such that systems external to the virtual-drive template are able to read the information describing the configuration of the virtual-drive template from the virtual-drive template; and
    is not shared by any other virtual-drive template in the plurality of virtual-drive templates;
  receive, from a requesting application executing on a requesting virtual machine, a provision request to provision a virtual drive for the requesting virtual machine, the provision request identifying at least one configuration specification of the virtual drive;
  in response to receiving the provision request, fulfill the provision request by:
    creating, from the plurality of virtual-drive templates, a copy of an appropriate virtual-drive template that matches the configuration specification of the provision request;
    converting the copy of the appropriate virtual-drive template into a fulfilling virtual-drive template by modifying, based at least in part on identification information of the requesting application included in the provision request, the burned-in configuration identifier of the copy of the appropriate virtual-drive template to include the identification information of the requesting application, thereby indicating that the fulfilling virtual-drive template is intended to be utilized by the application executing on the requesting virtual machine; and
    providing the fulfilling virtual-drive template to the requesting virtual machine; and
  utilize, by the requesting application executing on the requesting virtual machine, the fulfilling virtual-drive template in response to determining, at the requesting virtual machine, that the information included within the burned-in configuration identifier of the fulfilling virtual-drive template indicates that the fulfilling virtual-drive template is intended to be utilized by the requesting application.

20. The non-transitory computer-readable medium of claim 19, wherein the one or more computer-readable instructions further cause the computing device to generate a configuration ontology list that describes the configuration of each virtual-drive template.

* * * * *

UNITED STATES PATENT AND TRADEMARK OFFICE
CERTIFICATE OF CORRECTION

| | | |
|---|---|---|
| PATENT NO. | : 10,114,664 B1 | Page 1 of 1 |
| APPLICATION NO. | : 14/859389 | |
| DATED | : October 30, 2018 | |
| INVENTOR(S) | : Soumya Tripathy et al. | |

It is certified that error appears in the above-identified patent and that said Letters Patent is hereby corrected as shown below:

On the Title Page

In Column 2, item (74), Attorney, Agent or Firm, Line 1, delete "FisherBroyles LLP" and insert -- FisherBroyles, LLP --, therefor.

In the Claims

In Column 20, Line 26, Claim 10, delete "as" and insert -- a --, therefor.

In Column 21, Line 31, Claim 18, delete "identities" and insert -- identifies --, therefor.

Signed and Sealed this
Twelfth Day of February, 2019

Andrei Iancu
*Director of the United States Patent and Trademark Office*